(12) United States Patent
Ahn

(10) Patent No.: US 12,422,998 B2
(45) Date of Patent: Sep. 23, 2025

(54) MEMORY DEVICE AND MEMORY SYSTEM FOR PERFORMING PARTIAL WRITE OPERATION, AND OPERATING METHOD THEREOF

(71) Applicant: SK hynix Inc., Gyeonggi-do (KR)

(72) Inventor: Soo Hong Ahn, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/485,317

(22) Filed: Oct. 12, 2023

(65) Prior Publication Data

US 2024/0377958 A1    Nov. 14, 2024

(30) Foreign Application Priority Data

May 8, 2023  (KR) .................. 10-2023-0059037

(51) Int. Cl.
*G06F 3/06*  (2006.01)
(52) U.S. Cl.
CPC .......... *G06F 3/0614* (2013.01); *G06F 3/0652* (2013.01); *G06F 3/0659* (2013.01); *G06F 3/0673* (2013.01)
(58) Field of Classification Search
CPC .... G06F 3/0614; G06F 3/0652; G06F 3/0659; G06F 3/0673
USPC .................................................. 711/105, 155
See application file for complete search history.

(56) References Cited

U.S. PATENT DOCUMENTS

| | | | |
|---|---|---|---|
| 8,275,972 B2 | 9/2012 | Xu et al. | |
| 2018/0349041 A1* | 12/2018 | Zhou | G06F 3/0619 |
| 2021/0056028 A1* | 2/2021 | Ray | G06F 12/0811 |
| 2022/0261176 A1* | 8/2022 | Sonnekalb | G06F 3/0673 |
| 2023/0068494 A1* | 3/2023 | Keil | G06F 3/0676 |
| 2023/0350582 A1* | 11/2023 | Visconti | G11C 11/2275 |
| 2024/0419338 A1* | 12/2024 | Visconti | G11C 11/221 |

FOREIGN PATENT DOCUMENTS

KR    10-2014-0126225 A    10/2014

\* cited by examiner

*Primary Examiner* — Than Nguyen
(74) *Attorney, Agent, or Firm* — IP & T GROUP LLP

(57) ABSTRACT

A memory system includes a controller configured to transmit a reset write command and reset write data, and transmit a set write command and set write data; and at least one memory device configured to generate seed data by performing a first operation on the reset write data and read data read out from a target memory area in response to the reset write command, generate write data by performing a second operation on the seed data and the set write data in response to the set write command, and write back the write data to the target memory area.

13 Claims, 16 Drawing Sheets

FIG. 7

|  | LOAD_F | STORE_F | AND_F | OR_F |
|---|---|---|---|---|
| RST_WT | 1 | 0 | 1 | 0 |
| SET_WT | 0 | 1 | 0 | 1 |

MEMORY DEVICE AND MEMORY SYSTEM FOR PERFORMING PARTIAL WRITE OPERATION, AND OPERATING METHOD THEREOF

CROSS-REFERENCE TO RELATED APPLICATIONS

The present application claims the benefit of Korean Patent Application No. 10-2023-0059037, filed on May 8, 2023, which is incorporated herein by reference in its entirety.

BACKGROUND

1. Field

Various embodiments of the present invention relate to a semiconductor design technology, and more particularly, to a memory device and a memory system for performing a partial write operation.

2. Description of the Related Art

The memory device may perform a partial write operation to write data having a smaller size than a promised chunk size. For a partial write operation, the memory controller may provide a read-modify-write (RMW) command and partial write data to the memory device, and the memory device may perform operations to read data having a chunk size from memory cells, modify the read data with the partial write data, and write the modified data to the memory cells.

Since the partial write operation includes read-modify-write operations, a large number of partial write operations may lead to performance degradation of the memory system. Therefore, research is ongoing to efficiently perform the partial write operation.

SUMMARY

Embodiments of the present invention are directed to a memory device and a memory system capable of effectively performing a partial write operation without supporting a data mask pin.

According to an embodiment of the present invention, a memory system includes a controller configured to transmit a reset write command and reset write data, and transmit a set write command and set write data; and at least one memory device configured to generate seed data by performing a first operation on the reset write data and read data read out from a target memory area in response to the reset write command, generate write data by performing a second operation on the seed data and the set write data in response to the set write command, and write back the write data to the target memory area.

According to an embodiment of the present invention, a memory device includes a flag setting circuit configured to set a load flag signal and a first operation flag signal in response to a reset write command, and set a store flag signal and a second operation flag signal OR_F in response to a set write command; a bit calculation circuit configured to generate seed data by performing a first operation on read data and reset write data according to the first operation flag signal, and generate write data by performing a second operation on the seed data and set write data according to the second operation flag signal; and a column control circuit configured to read out the read data from a target memory area according to the load flag signal, and write back the write data to the target memory area according to the store flag signal.

According to an embodiment of the present invention, an operating method of a memory device includes receiving a reset write command and reset write data from a controller; generating seed data by performing a first operation on the reset write data and read data read out from a target memory area in response to the reset write command; receiving a set write command and set write data from the controller; generating write data by performing a second operation on the seed data and the set write data in response to the set write command; and writing back the write data to the target memory area.

According to embodiments of the present invention, when a memory device that does not support a data mask pin performs a partial write operation, the partial write operation may be performed internally through predetermined bit operations without transmitting the extracted data from the memory device to the memory controller. Therefore, the memory system may reduce the latency while minimizing the power consumption due to the partial write operation.

BRIEF DESCRIPTION OF THE DRAWINGS

FIG. 7 is a diagram for describing setting of flag signals according to a reset write command and a set write command according to an embodiment of the present invention.

DETAILED DESCRIPTION

Figure 1:
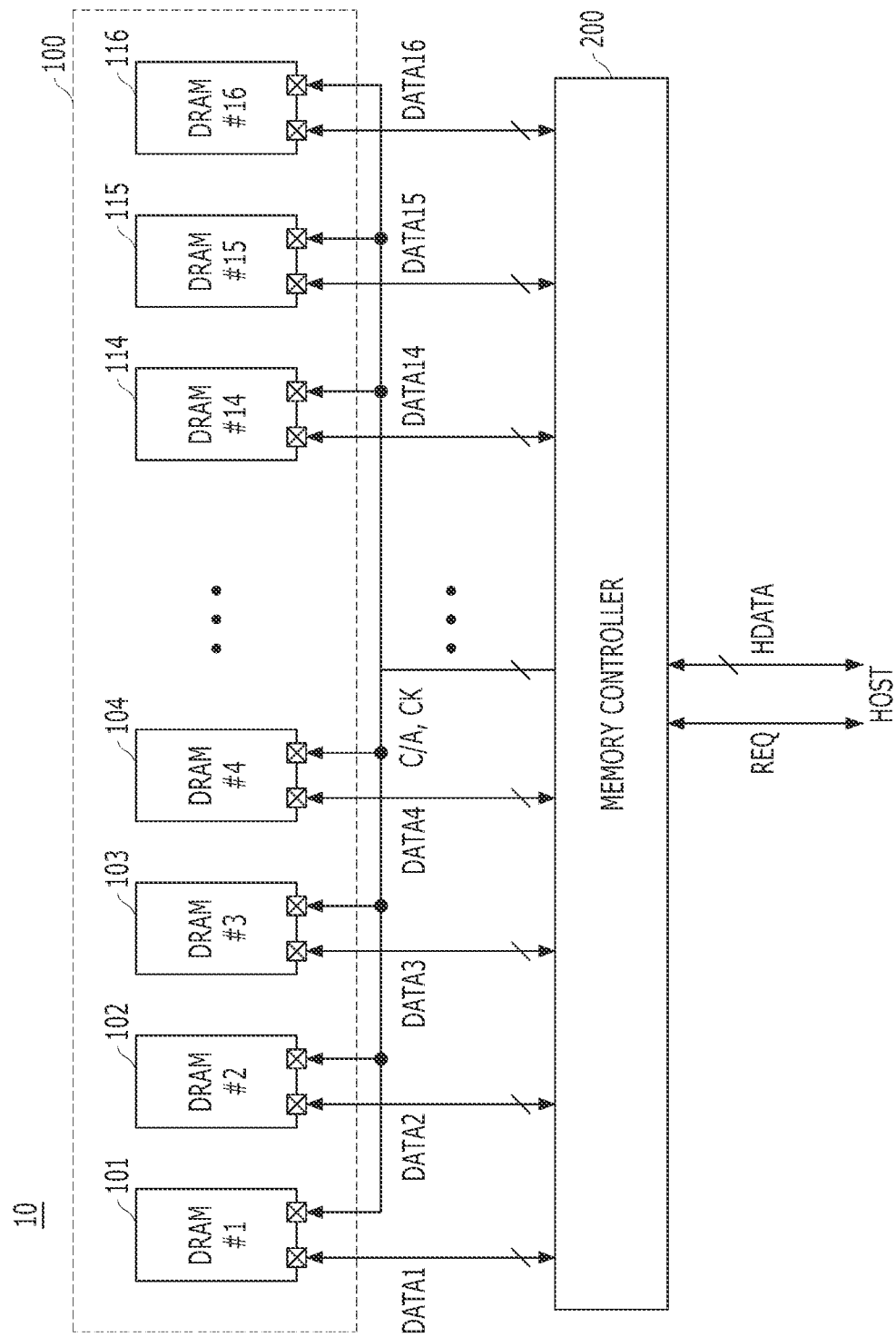
FIG. 1 is a block diagram illustrating a memory system in accordance with an embodiment of the present invention.

Various embodiments of the present disclosure will be described below in more detail with reference to the accompanying drawings. The present disclosure may have embodiments in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present disclosure.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

FIG. 1 is a block diagram illustrating a memory system 10 in accordance with an embodiment of the present invention.

Referring to FIG. 1, the memory system 10 may store data or read the stored data in response to a request provided from a host (i.e., an external device). The memory system 10 may be used as a main storage device or an auxiliary storage device of the host. The memory system 10 may be used as a device to store data under the control of the host, such as a mobile phone, a smartphone, an MP3 player, a laptop computer, a desktop computer, a game console, TV, a tablet PC, or an in-vehicle infotainment system.

The host may include at least one independent and substantial processor, which may be referred to as a core. The host may be implemented with a single core processor or a multi-core processor including two or more cores. The host may communicate with the memory system 10 using at least one of various communication standards or interfaces such as, for example, Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe of PCI-e), Non-Volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The memory system 10 may include a plurality of memory devices, and a memory controller 200. In an embodiment, the memory controller 200 may constitute a memory module 100. The memory module 100 may include one selected from a dual-inline memory module (DIMM), a registered DIMM (RDIMM), a load reduced DIMM (LRDIMM), a non-volatile DIMM (NVDIMM). In an embodiment, the memory devices and the memory controller 200 may constitute a memory module 100.

The memory controller 200 may control an overall operation of the memory system 10 and control a data transmission between the host and the memory devices 101 to 116. The memory controller 200 may generate a command/address signal C/A and provide it to the memory devices 101 to 116 according to a request REQ from the host. The memory controller 200 may provide a clock CK to the memory devices 101 to 116 together with the command/address signal C/A. The memory controller 200 may provide data DATA1 to DATA16 corresponding to host data HDATA received from the host to the memory devices 101 to 116, during a write operation. The memory controller 200 may transmit data DATA1 to DATA16 read from the memory devices 101 to 116 to the host as host data HDATA, during a read operation.

The memory devices 101 to 116 may perform an active operation, a precharge operation, a write operation, a read operation, and a partial write operation, according to the command/address signal C/A, the clock CK, and/or the data DATA1 to DATA16, which are received from the memory controller 200. The memory devices 101 to 116 may have separate data lines (i.e., data buses) and a common command/address/clock line. That is, the memory devices 101 to 116 may transmit and receive the data DATA1 to DATA16 to and from the memory controller 200 through the dedicated data lines, while transferring the command/address signal C/A and the clock CK through the shared command/address/clock lines.

Hereinafter, for convenience of description, a case where first to sixteenth memory devices 101 to 116 are arranged in the memory module 100, will be described as an example. For reference, each memory device may receive and transmit serial data having a preset length through a plurality of data pads/pins in a write operation and a read operation. In this case, the preset length may be set by a burst length (BL) defined in the specification. The number of data pads/pins and the burst length (BL) may determine the size of the data. In the following embodiment, a case where 4 data pads/pins of each memory device are arranged, and 8-bit data are transmitted and received in series (i.e., BL=8) through each data pads/pins at each write and read operation will be described as an example. Namely, each of the first to sixteenth memory devices 101 to 116 may transmit and receive 32-bit data at a time, and the memory module 100 may transmit and receive data in a chunk size of 512 bits (i.e., 64 bytes).

Figure 2:
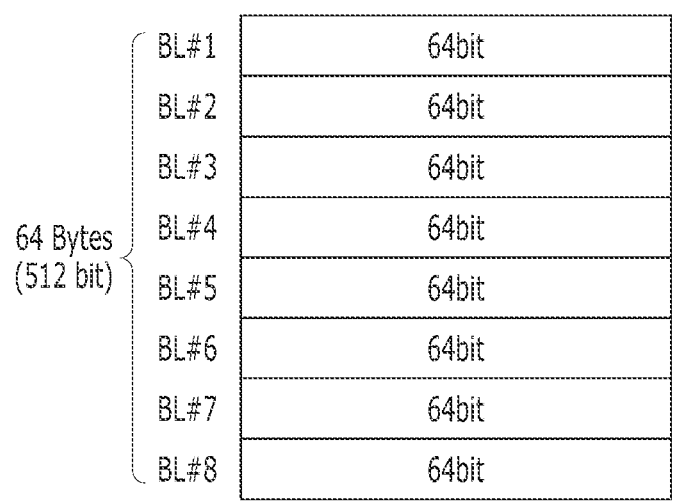
FIG. 2 is a diagram for describing a structure of data transferred between memory devices and a memory controller shown in FIG. 1.

As shown in FIG. 2, the first to sixteenth memory devices 101 to 116 may transmit and receive data to and from the memory controller 200 in a chunk size of 64 bytes by outputting 64-bit data through all 64 data pads/pins for each burst length BL #1 to BL #8.

In general, to perform partial write operations, a memory controller may provide read-modify-write (RMW) commands and partial write data to a memory device. The memory device may perform a read operation to read data having a chunk size from memory cells, a modify operation to update the read data with the partial write data, and a write operation to write back the modified read data to the memory cells. At this time, the memory device may place a data mask (DM) pin and transfer the partial write data using the DM pin to specify only bits to be partially written.

In recent years, as a memory module has become highly integrated and a large-capacity memory module has been developed, a memory device without a DM pin has been proposed, and a method has been proposed to perform a modify operation in the memory controller for a partial write operation in the memory device without the DM pin.

Figure 3A:
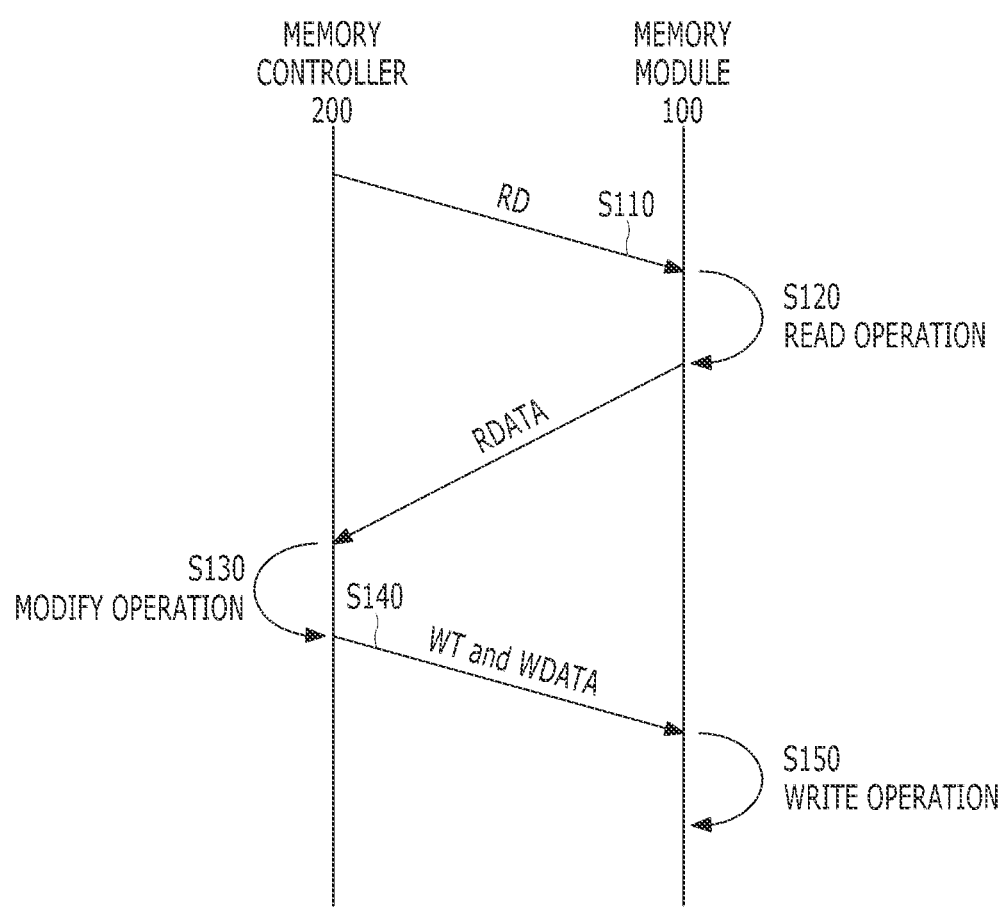
FIGS. 3A and 3B are diagrams for describing a typical partial write operation.
Figure 3B:
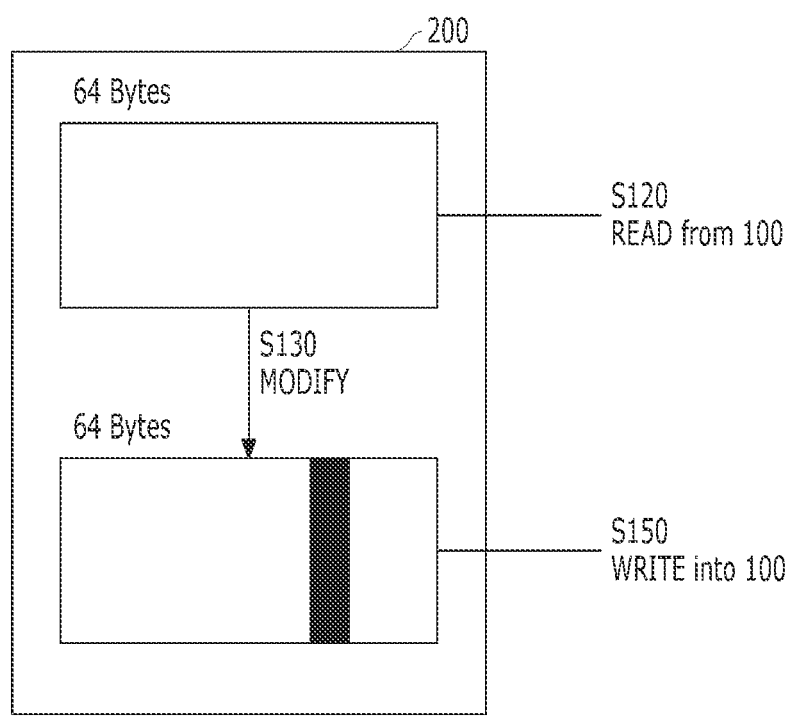

FIGS. 3A and 3B are diagrams for describing a partial write operation when the DM pin is not supported.

Referring to FIGS. 3A and 3B, the memory controller 200 may provide the memory module 100 with a read command RD and an address for specifying a memory area to be read (at S110). The memory module 100 may perform a read operation on the memory area corresponding to the address to provide read data RDATA having a chunk size (e.g., 64 bytes) to the memory controller 200 (at S120).

Then, the memory controller 200 may perform a modify operation to update partial bits of the read data RDATA with partial write data (at S130). The memory controller 200 may provide the memory module 100 with the partially updated write data WDATA having a chunk size (e.g., 64 bytes) along with a write command WT and an address for specifying a memory area to be written (at S140).

Thereafter, the memory module 100 may perform a write operation to write the write data WDATA to the memory area corresponding to the address (at S150).

As described above, a partial write operation may be performed without the DM pin such that the memory controller 200 receives the read data from the memory module 100, performs the modify operation and provides the write data back to the memory module 100. However, in this case, the data transmission bandwidth may not be utilized since all bytes of data should be transmitted, and the latency and power consumption are increased since the read data and the write data should be transferred between the memory controller 200 and the memory module 100.

Hereinafter, in accordance with embodiments of the present invention, a method for efficiently performing a partial write operation will be described.

Figure 4:
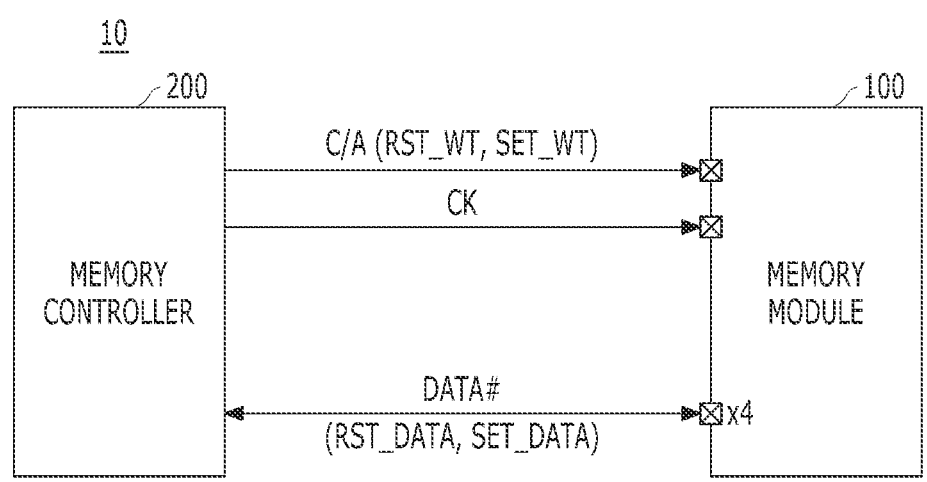
FIG. 4 is a block diagram illustrating a memory system according to an embodiment of the present invention.

FIG. 4 is a block diagram illustrating a memory system 10 according to an embodiment of the present invention. The memory system 10 shown in FIG. 4 is a simplified block diagram of the memory system 10 shown in FIG. 1.

Referring to FIG. 4, to perform a partial write operation, the memory controller 200 may transmit a reset write command RST_WT, an address, and reset write data RST_DATA to the memory module 100, and may transmit a set write command SET_WT, an address, and set write data SET_DATA to the memory module 100. The reset write command RST_WT and the address may be provided in the form of the command/address signal C/A, and the set write command SET_WT and the address may be provided in the form of the command/address signal C/A. Further, the reset write data RST_DATA and the set write data SET_DATA may be provided to the memory module 100 in the form of data DATA #, where # is a natural number ranging between 1 to 16. In an embodiment, the reset write command RST_WT and the set write command SET_WT may not be included in the command/address signal C/A, that is, the reset write command RST_WT and the set write command SET_WT may be provided to the memory module 100 via a separate signal line.

Figure 5:
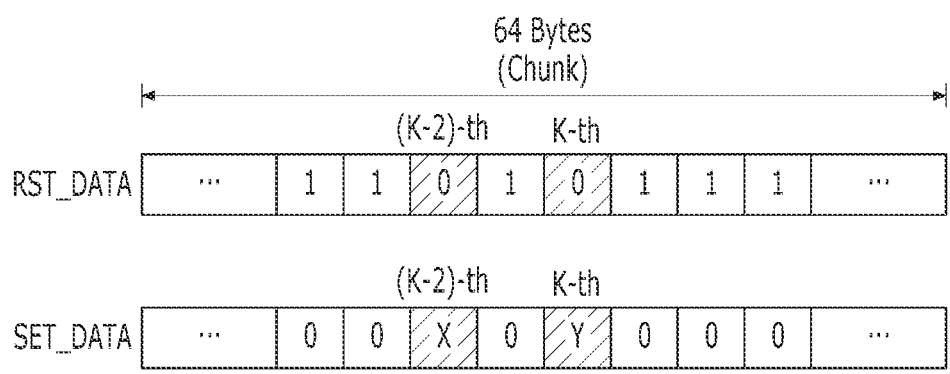
FIG. 5 is a diagram for describing a configuration of reset write data and set write data according to an embodiment of the present invention.

In an embodiment, the reset write data RST_DATA may be data in which bits (hereinafter referred to as "first bits") to be partially written are set to low bits and the remaining bits (hereinafter referred to as "second bits") are set to high bits. Further, the set write data SET_DATA may be data in which the second bits are set to low bits. For example, referring to FIG. 5, when partially writing (K−2)-th and K-th bytes of data having a chunk size of 64 bytes, the memory controller 200 may provide the memory module 100 with the reset write data RST_DATA in which bits (i.e., the first bits) included in the (K−2)-th and the K-th bytes are set to low bits and the remaining bits (i.e., the second bits) included in the remaining bytes are set to high bits. Further, the memory controller 200 may provide the memory module 100 with the set write data SET_DATA in which the bits (i.e., the first bits) included in the (K−2)-th and the K-th bytes are set to target bits to be updated, and the bits (i.e., the second bits) included in the remaining bytes are set to low bits.

Referring back to FIG. 4, the memory module 100 may read out read data from a target memory area corresponding to the address according to the reset write command RST_WT, and generate seed data by performing a first operation (i.e., first calculation) on the read data and the reset write data RST_DATA. For example, the first operation may include a logic AND operation, that is, the memory module 100 may generate the seed data by performing a logic AND operation on the read data and the reset write data RST_DATA bit by bit. In this case, since the first bits of the reset write data RST_DATA are set to low bits, the seed data may be the same as the read data except that the first bits are set to low bits.

Further, the memory module 100 may generate write data by performing a second operation (i.e., second calculation) on the seed data and the set write data SET_DATA according to the set write command SET_WT. For example, the second operation may include a logic OR operation, that is, the memory module 100 may generate the write data by performing a logic OR operation on the seed data and the set write data SET_DATA bit by bit. In this case, since the first bits of the seed data are set to low bits and the second bits of the set write data SET_DATA are set to low bits, the write data may be data in which only the first bits of the original read data are updated to the target bits. The memory module 100 may finally complete the partial write operation by writing back the write data to the target memory area.

Figure 6:
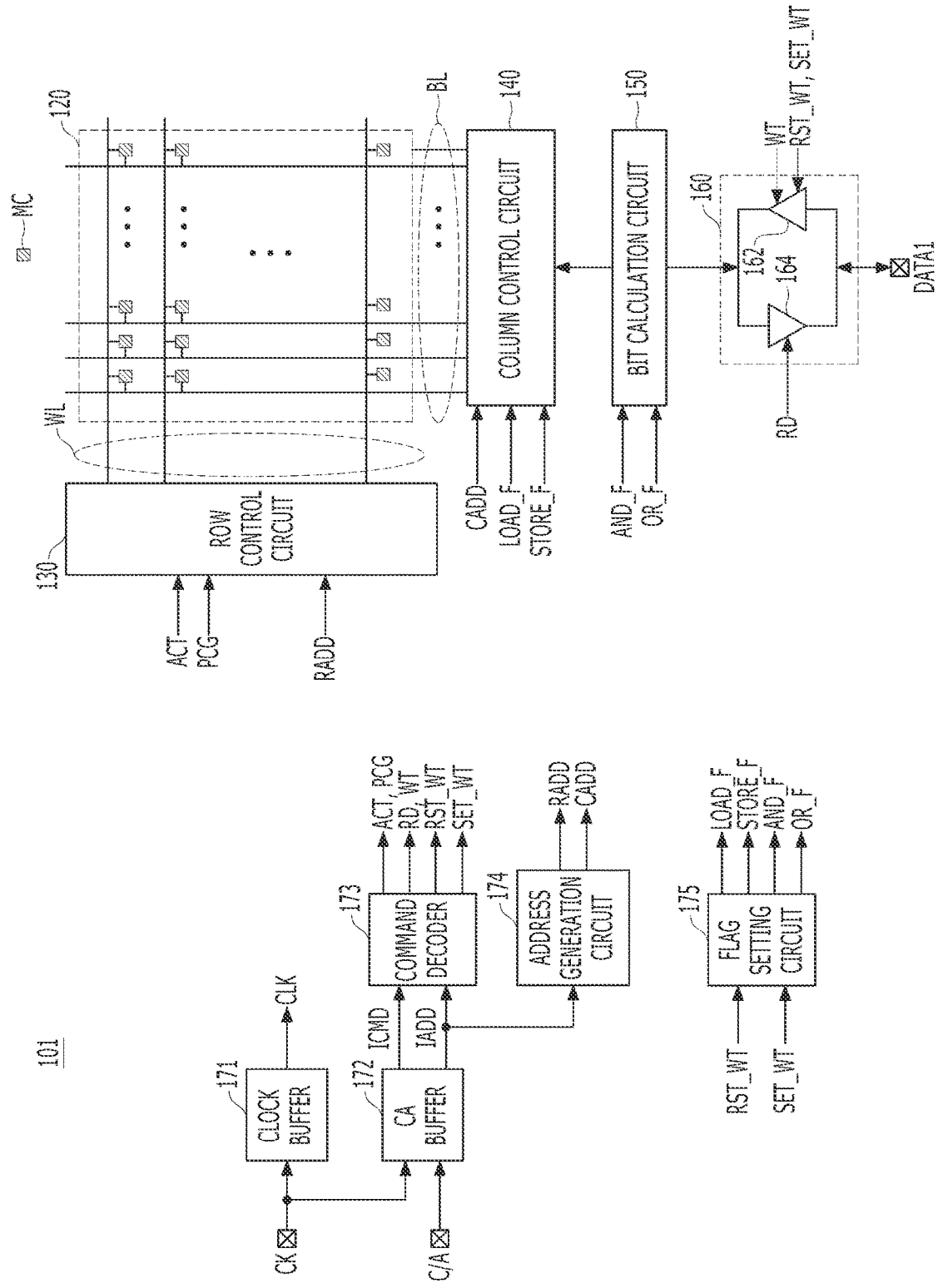
FIG. 6 is a block diagram illustrating one memory device according to an embodiment of the present invention.

FIG. 6 is a block diagram illustrating one memory device according to an embodiment of the present invention. In FIG. 6, the first memory device 101 shown in FIG. 1 is illustrated as an example.

Referring to FIG. 6, the first memory device 101 may include a memory cell region 120, a row control circuit 130, a column control circuit 140, a bit calculation circuit 150, a data input/output circuit 160, a clock buffer 171, a command/address (CA) buffer 172, a command decoder 173, an address generation circuit 174, and a flag setting circuit 175.

The memory cell region 120 may include a plurality of memory cells MC respectively coupled between a plurality of word lines WL and a plurality of bit lines BL. The plurality of word lines WL may extend in a first direction (e.g., a row direction) and may be sequentially disposed in a second direction (e.g., a column direction). The plurality of bit lines BL may extend in the column direction and may be sequentially disposed in the row direction. The memory cell region 120 may be composed of at least one bank. The number of banks or the number of Memory cells MC may be determined depending on the capacity of the first memory device 101. In FIG. 6, a bank is shown as an example.

The clock buffer 171 may externally receive a clock CK. For example, the clock buffer 171 may receive the clock CK from the memory controller 200. The clock buffer 171 may generate an internal clock signal CLK by buffering the clock CK. In an embodiment, the memory controller 200 may transfer system clocks to the first memory device 101 in a differential manner, and the first memory device 101 may include clock buffers that receive the differential clocks, respectively.

The CA buffer 172 may receive a command/address signal C/A from the memory controller 200 in synchronization with the clock CK. The CA buffer 172 may sample the command/address signal C/A in synchronization with the clock CK and output an internal command ICMD and an internal address IADD. Consequently, the first memory device 101 may be synchronized with the clock CK.

The command decoder 173 may decode the internal command ICMD which is output from the CA buffer 172 to generate an active command ACT, a precharge command PCG, a read command RD, and a write command WT. Further, the command decoder 173 may decode the internal command ICMD to generate a reset write command RST_WT and a set write command SET_WT to perform a partial write operation.

The address generation circuit 174 may generate a row address RADD and a column address CADD by classifying the internal address IADD received from the CA buffer 172.

In an embodiment, the address generation circuit 174 may classify some bits of the internal address IADD as the row address RADD and classify the remaining bits as the column address CADD. The address generation circuit 174 may classify the internal address IADD as the row address RADD when an active operation is instructed as a result of the decoding by the command decoder 173, and may classify the internal address IADD as the column address CADD when a read or write operation is instructed. The plurality of word lines WL may be accessed according to the row address RADD, and the plurality of bit lines BL may be accessed according to the column address CADD.

The flag setting circuit 175 may selectively set a load flag signal LOAD_F, a store flag signal STORE_F, a first operation flag signal AND_F, and a second operation flag signal OR_F, according to the reset write command RST_WT and the set write command SET_WT. For example, as shown in FIG. 7, the flag setting circuit 175 may set the load flag signal LOAD_F and the first operation flag signal AND_F to a logic high level (i.e., activated level) in response to the reset write command RST_WT. Further, the flag setting circuit 175 may set the store flag signal STORE_F and the second operation flag signal OR_F to a logic high level (i.e., activated level) in response to the set write command SET_WT.

The row control circuit 130 may perform an active operation to activate a word line corresponding to the row address RADD, among the plurality of word lines WL, according to the active command ACT, and perform a precharge operation to deactivate (precharge) the activated word line according to the precharge command PCG.

The column control circuit 140 may select a preset number of the plurality of bit lines BL corresponding to the column address CADD, and sense and amplify the selected bit lines BL. For example, the column control circuitry 140 may include a column selection circuit and a sense amplifier circuit. The column selection circuit may decode the column address CADD to select the preset number of the bit lines BL, and the sense amplifier circuit may sense and amplify data of the selected bit lines BL.

In an embodiment, the column control circuit 140 may sense and amplify the data of the selected bit lines BL and read out data (hereinafter referred to as "read data") from a target memory area of the memory cell region 120, and provide the read data to the bit operation circuit 150, according to the load flag signal LOAD_F. Further, the column control circuit 140 may store seed data generated by a first operation of the bit operation circuit 150 into the sense amplifier circuit, according to the load flag signal LOAD_F. In an embodiment, the column control circuit 140 may provide the stored seed data to the bit operation circuit 150 according to the store flag signal STORE_F, and may write back write data generated by a second operation of the bit operation circuit 150 to the target memory area.

The bit operation circuit 150 may generate the seed data by performing the first operation on the read data and reset write data (RST_DATA in FIG. 4) in response to the first operation flag signal AND_F. Further, the bit operation circuit 150 may generate the write data by performing the second operation on the seed data and set write data (SET_DATA in FIG. 4) in response to the second operation flag signal OR_F.

The data input/output circuit 160 may receive data DATA1 to be written to the memory cell region 120 from the memory controller 200 during a write operation, and transmit data DATA1 read from the memory cell region 120 to the memory controller 200 during a read operation. The data input/output circuit 160 may include an input circuit 162 operating in response to the write command WT and an output circuit 164 operating in response to the read command RD. In an embodiment, the input circuit 162 may receive the data DATA1 as the reset write data RST_DATA in response to the reset write command RST_WT, and receive the data DATA1 as the set write data SET_DATA in response to the set write command SET_WT.

Hereinafter, referring now to FIGS. 4 to 10B, a partial write operation according to an embodiment of the present invention will be described.

Figure 8:
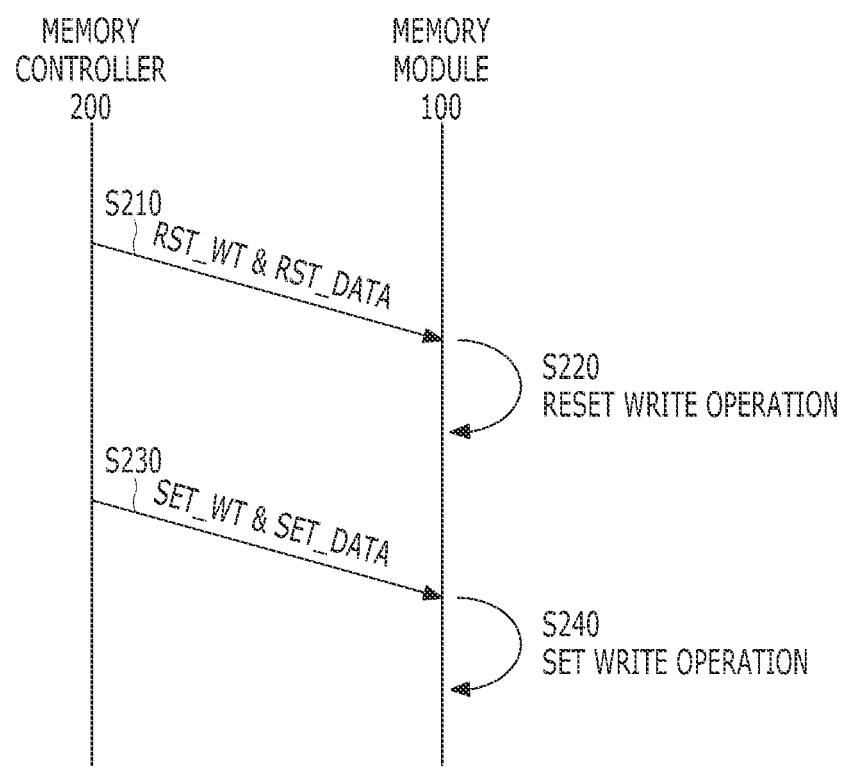
FIG. 8 is a sequence diagram for describing a partial write operation according to an embodiment of the present invention.
Figure 9A:
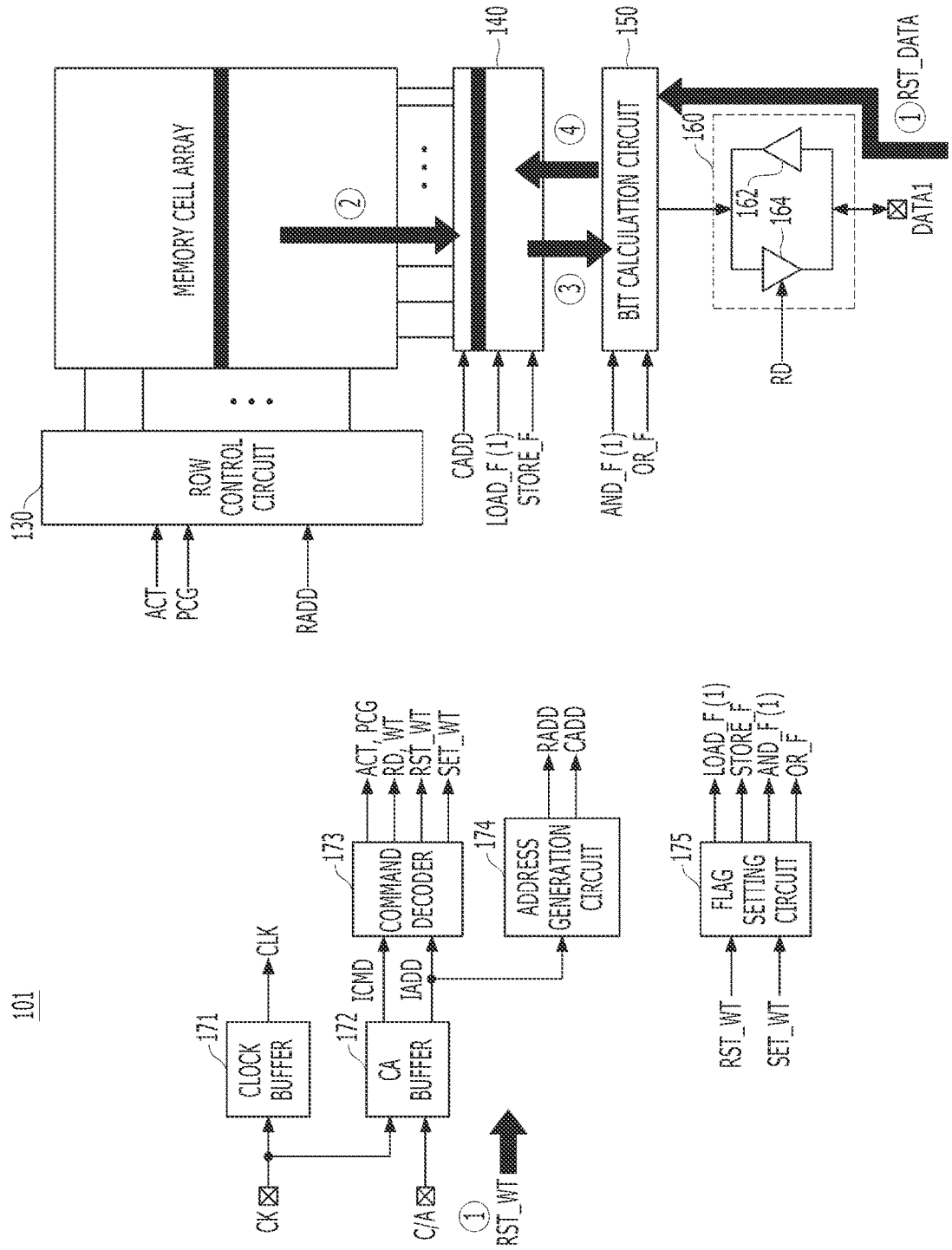
FIGS. 9A and 9B are diagrams for describing a reset write operation shown in FIG. 8.
Figure 9B:
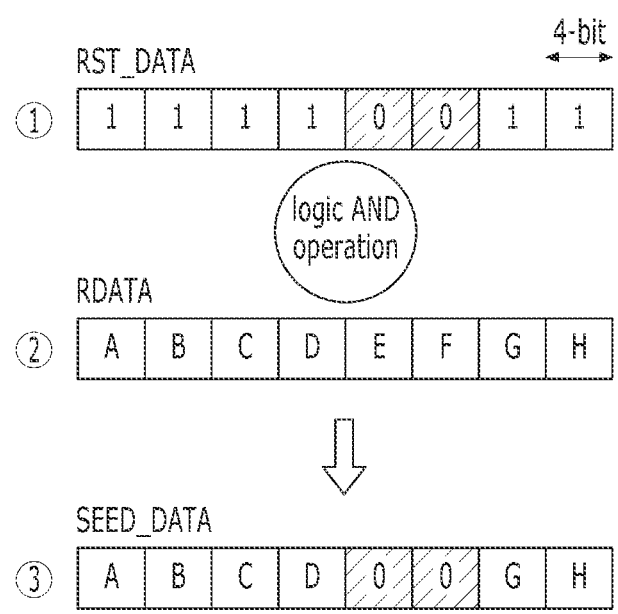
Figure 10A:
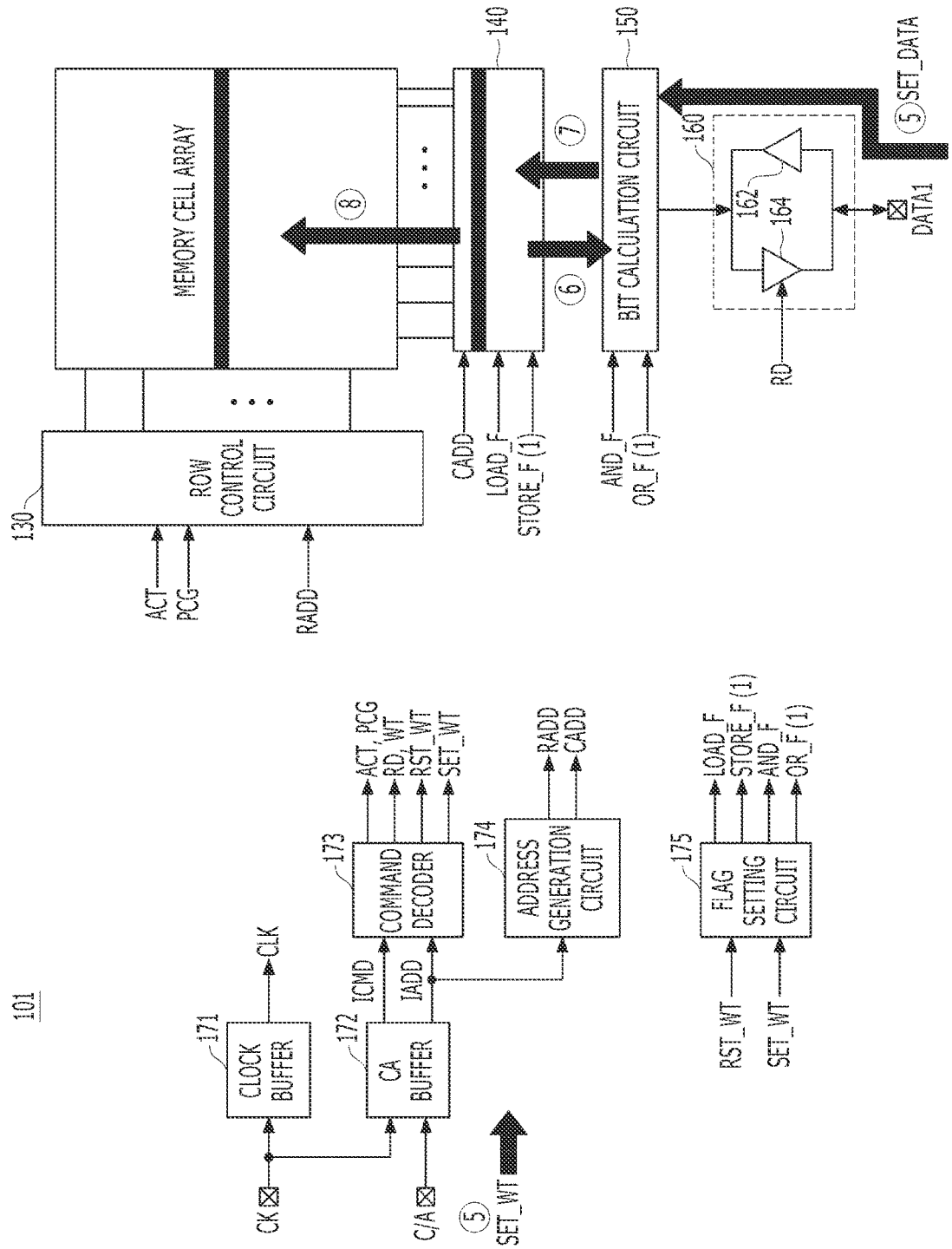
FIGS. 10A and 10B are diagrams for describing a set write operation shown in FIG. 8.
Figure 10B:
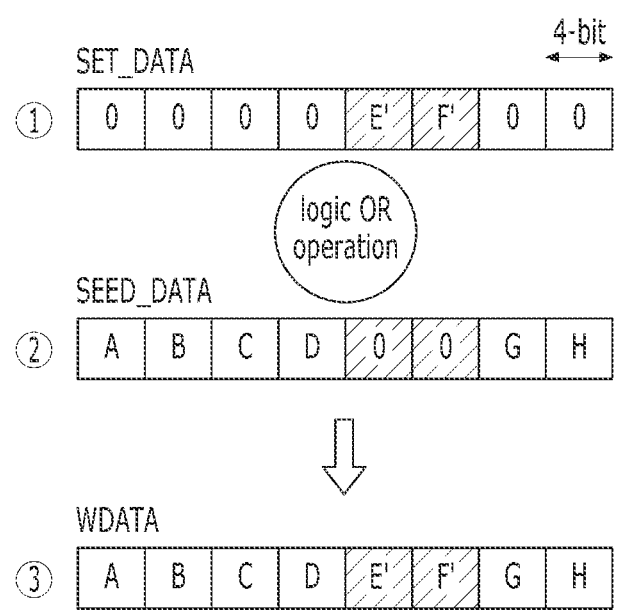

FIG. 8 is a sequence diagram for describing a partial write operation according to an embodiment of the present invention. FIGS. 9A and 9B are diagrams for describing a reset write operation shown in FIG. 8. FIGS. 10A and 10B are diagrams for describing a set write operation shown in FIG. 8.

Referring to FIG. 8, the memory controller 200 may provide a reset write command RST_WT and an address for specifying a target memory area to be partially written as a command/address signal C/A, and provide reset write data RST_DATA in the form of data DATA # to the memory module 100 (at S210). Each memory device of the memory module 100 may perform a reset write operation to generate seed data by performing a first operation on the reset write data RST_DATA and the read data output from the target memory area corresponding to the address, in response to the reset write command RST_WT (at S220).

In detail, referring to FIG. 9A, the command decoder 173 of each memory device may decode the command/address signal C/A to generate the reset write command RST_WT, and the input circuit 162 may receive the reset write data RST_DATA, in response to the reset write command RST_WT (①). The address generation circuit 174 may generate a row address RADD and a column address CADD based on the command/address signal C/A.

At this time, the flag setting circuit 175 may set the load flag signal LOAD_F and first operation flag signal AND_F to a logic high level in response to the reset write command RST_WT. The column control circuit 140 may select a preset number of bit lines BL corresponding to the column address CADD, and read out the read data from the target memory area of the memory cell region 120 in response to the load flag signal LOAD_F of a logic high level. The bit operation circuit 150 may generate the seed data by performing a first operation on the read data and the reset write data RST_DATA in response to the first operation flag signal AND_F of a logic high level (③). Then, the column control circuit 140 may store the seed data generated by the first operation of the bit operation circuit 150 (④).

Referring to FIG. 9B, each memory device transmits and receives 32-bit data at a time, an example of generating seed data SEED_DATA by performing a first operation on 32-bit reset write data RST_DATA and 32-bit read data RDATA is shown. In FIG. 9B, the reset write data RST_DATA of "11110011" are input on 4-bit basis, where first bits to be partially written are set to low bits and second bits except for the first bits are set to high bits. When the read data RDATA of "ABCDEFGH" are read from the target memory area, the bit operation circuit 150 may generate the seed data SEED_DATA of "ABCDOOGH". That is, the bit operation circuit 150 may generate the seed data SEED_DATA that is identical to the read data RDATA except that the first bits are set to low bits.

Referring again to FIG. 8, the memory controller 200 may provide a set write command SET_WT and an address for specifying the target memory area as the command/address signal C/A, and provide set write data SET_DATA in the form of data DATA # to the memory module 100 (at S230). Each memory device of the memory module 100 may perform a set write operation to generate write data by performing a second operation on the seed data stored in the column control circuit 140 and the set write data SET_DATA, and store the write data in the target memory area, in response to the set write command SET_WT (at S240).

In detail, referring to FIG. 10A, the command decoder 173 of each memory device may decode the command/address signal C/A to generate the set write command SET_WT, and the input circuit 162 may receive the set write data SET_DATA, in response to the set write command SET_WT (⑤). The address generation circuit 174 may generate the row address RADD and the column address CADD based on the command/address signal C/A.

At this time, the flag setting circuit 175 may set the store flag signal STORE_F and the second operation flag signal OR_F to a logic high level in response to the set write command SET_WT. The column control circuit 140 may select a preset number of bit lines BL corresponding to the column address CADD, and provide the stored seed data to the bit operation circuit 150 in response to the store flag signal STORE_F of a logic high level (⑥). The bit operation circuit 150 may generate the write data by performing a second operation on the seed data and the set write data SET_DATA in response to the second operation flag signal OR_F of a logic high level (⑦) and provide the write data to the column control circuit 140. Then, the column control circuit 140 may write back the write data to the target memory area in response to the store flag signal STORE_F.

Referring to FIG. 10B, when each memory device transmits and receives 32-bit data at a time, an example of generating write data WDATA by performing a second operation on 32-bit set write data SET_DATA and 32-bit seed data SEED_DATA is shown. In FIG. 10B, the set write data SET_DATA of "0000E'F'00" are input on 4-bit basis, where the first bits to be partially written are set to target bits (e.g., "E'-F'" on 4-bit basis), and the second bits except for the first bits are set to low bits. Since the seed data SEED_DATA are "ABCDOOGH" calculated in FIG. 9B, the bit operation circuit 150 may generate the write data WDATA of "ABCDE'F'GH", i.e., the bit operation circuit 150 may generate the write data WDATA in which only the first bits of the original read data RDATA of "ABCDEFDH" in FIG. 9B are updated with the target bits.

Figure 11A:
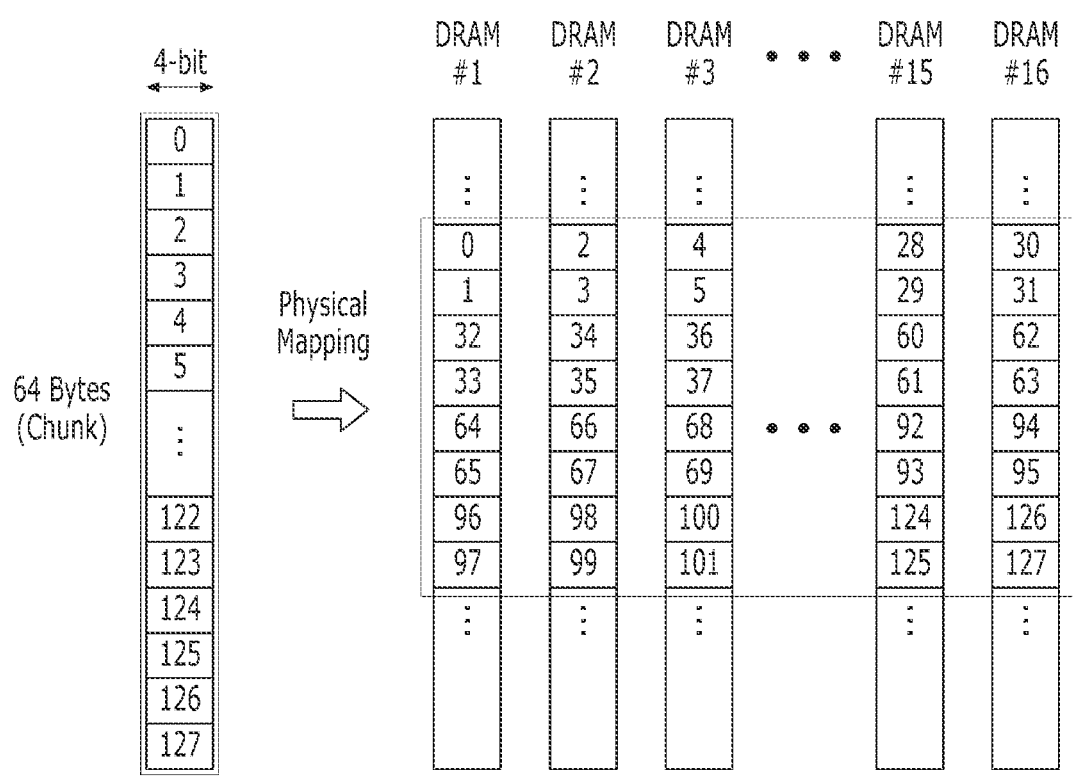
FIGS. 11A to 11C are diagrams for describing data mapping between a memory controller and a memory module by a partial write operation according to an embodiment of the present invention.
Figure 11B:
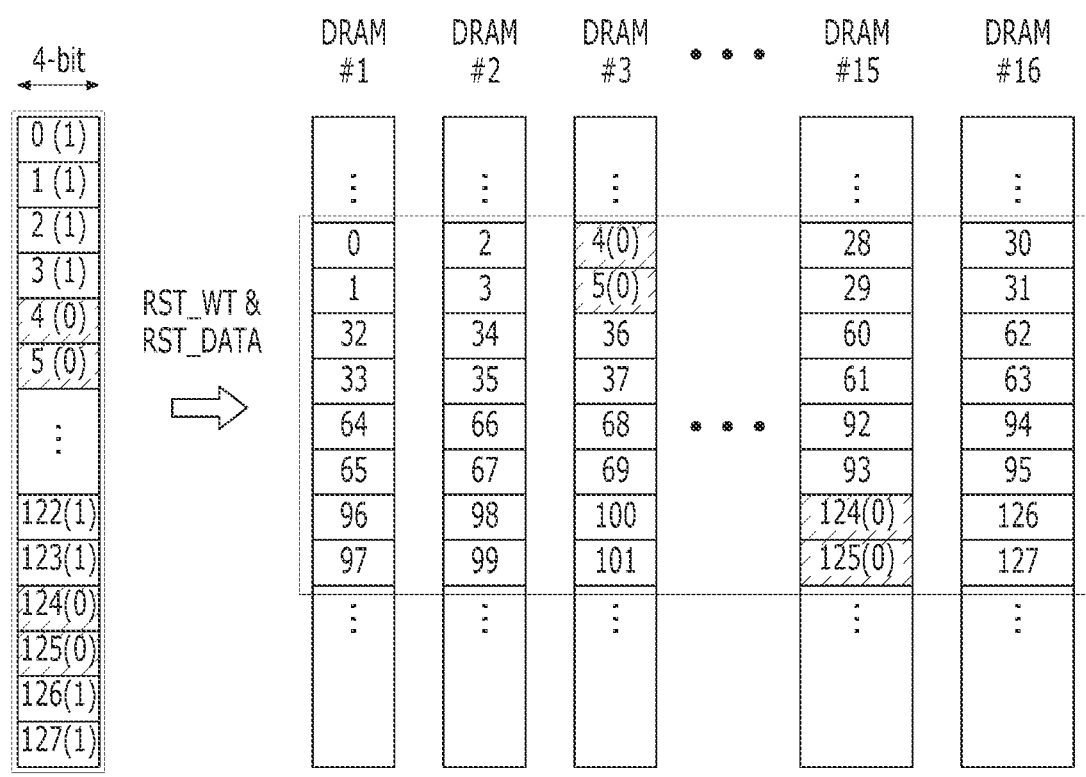
Figure 11C:
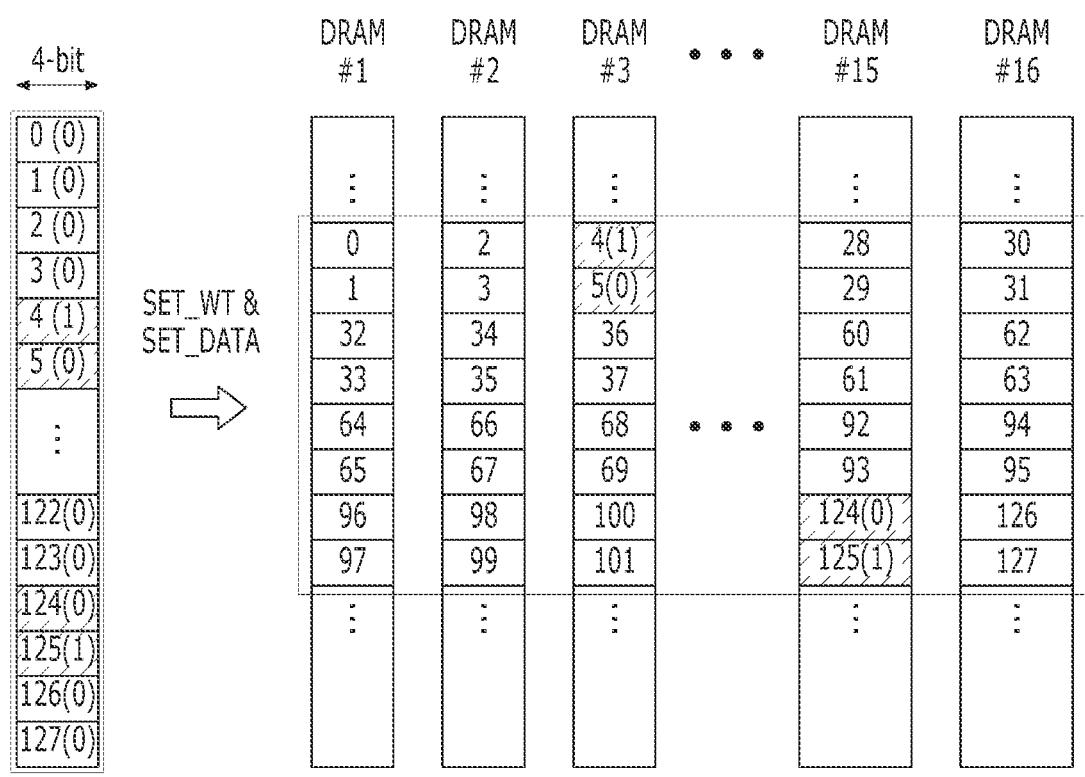

FIGS. 11A to 11C are diagrams for describing data mapping between a memory controller and a memory module by a partial write operation according to an embodiment of the present invention.

Referring to FIG. 11A, the memory controller and first to sixteenth memory devices (DRAM #1 to DRAM #16) included in the memory module may transmit and receive data in a chunk size of 64 bytes. The 64 bytes of data may comprise 128 units of data on 4-bit basis, and two units of data may be physically mapped to the first to sixteenth memory devices in an interleaved manner.

Referring to FIG. 11B, the memory controller may provide reset write data RST_DATA along with a reset write command RST_WT to the memory module. When partially writing fifth and sixth unit data and 125-th and 126-th unit data, the bits of the fifth and sixth unit data and the bits of the 125-th and 126-th unit data in the reset write data RST_DATA may be set to low bits, and the bits of the remaining unit data may be set to high bits. The fifth and sixth unit data set to low bits are written to the third memory device, and the 125-th and 126-th unit data set to low bits are written to the fifteenth memory device. Each memory device may generate seed data by performing a logic AND operation on read data read from a target memory area and the reset write data RST_DATA in response to the reset write command RST_WT. In this case, the seed data generated by the third memory device and the fifteenth memory device may be composed of low bits, and the seed data generated by the remaining memory devices may be composed of the same data as the read data.

Referring to FIG. 11C, the memory controller may provide set write data SET_DATA along with a set write command SET_WT to the memory module. At this time, the bits of the fifth and sixth unit data and the bits of the 125-th and 126-th unit data of the set write data SET_DATA may be set to target bits, and the bits of the remaining unit data may be set to low bits. Each memory device may generate write data by performing a logic OR operation on the seed data and the set write data SET_DATA in response to the set write command SET_WT. At this time, only the write data generated by the third memory device and the fifteenth memory device are updated with the target bits, and the write data generated by the remaining memory devices may be composed of the same data as the read data. Accordingly, a partial write operation may be performed in which only the unit data of the third memory device and the fifteenth memory device is partially written.

As described above, according to the embodiments of the present invention, the memory device may set only the bits to be partially written to low bits, among the read data, according to the reset write command and the reset write data received from the memory controller. Furthermore, the memory device may generate the write data by updating the set low bits to the target bits according to the set write command and the set write data received from the memory controller. Therefore, the latency and power consumption required to transfer data to and from the memory controller during a partial write operation of the memory device that does not support a data mask pin may be minimized.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of this disclosure and the following claims.

For example, for the logic gates and transistors provided as examples in the above-described embodiments, different positions and types may be implemented depending on the polarity of the input signal.

What is claimed is:

1. A memory system comprising:
 a controller configured to transmit a reset write command and reset write data, and transmit a set write command and set write data; and at least one memory device configured to
generate seed data by performing a first operation on the reset write data and read data read out from a target memory area in response to the reset write command,
generate write data by performing a second operation on the seed data and the set write data in response to the set write command, and
write back the write data to the target memory area.

2. The memory system of claim 1, wherein the first operation includes a logic AND operation.

3. The memory system of claim 2, wherein the second operation includes a logic OR operation.

4. The memory system of claim 1,
wherein the reset write data are data in which bits to be partially written are set to low bits and remaining bits are set to high bits, and
wherein the set write data are data in which the remaining bits are set to low bits.

5. The memory system of claim 1, wherein the memory device includes:
a flag setting circuit configured to set a load flag signal and a first operation flag signal in response to the reset write command, and set a store flag signal and a second operation flag signal OR_F in response to the set write command;
a bit calculation circuit configured to generate the seed data by performing the first operation on the read data and the reset write data according to the first operation flag signal, and generate the write data by performing the second operation on the seed data and the set write data according to the second operation flag signal; and
a column control circuit configured to read out the read data from the target memory area according to the load flag signal, and write back the write data to the target memory area according to the store flag signal.

6. The memory system of claim 5, wherein the column control circuit is configured to:
store the seed data generated by the bit operation circuit according to the load flag signal; and
provide the stored seed data to the bit operation circuit according to the store flag signal.

7. An operating method of a memory device, the operating method comprising:
receiving a reset write command and reset write data from a controller;
generating seed data by performing a first operation on the reset write data and read data read out from a target memory area in response to the reset write command;
receiving a set write command and set write data from the controller;
generating write data by performing a second operation on the seed data and the set write data in response to the set write command; and
writing back the write data to the target memory area.

8. The operating method of claim 7, wherein the first operation includes a logic AND operation.

9. The operating method of claim 8, wherein the second operation includes a logic OR operation.

10. The operating method of claim 7,
wherein the reset write data are data in which bits to be partially written are set to low bits and remaining bits are set to high bits, and
wherein the set write data are data in which the remaining bits are set to low bits.

11. The operating method of claim 7, wherein the generating seed data includes:
setting a load flag signal and a first operation flag signal in response to the reset write command;
reading out the read data from the target memory area according to the load flag signal; and
generating the seed data by performing the first operation on the read data and the reset write data according to the first operation flag signal.

12. The operating method of claim 7, further comprising storing the seed data after generating the seed data.

13. The operating method of claim 7, wherein the generating write data includes:
setting a store flag signal and a second operation flag signal OR_F in response to the set write command;
generating the write data by performing the second operation on the seed data and the set write data according to the second operation flag signal; and
write back the write data to the target memory area according to the store flag signal.

* * * * *